June 3, 1941.   F. G. CARNAHAN   2,244,648
METHOD OF PRODUCING SELF-SEALING TIRE INNER TUBES
Filed June 5, 1940   2 Sheets-Sheet 1
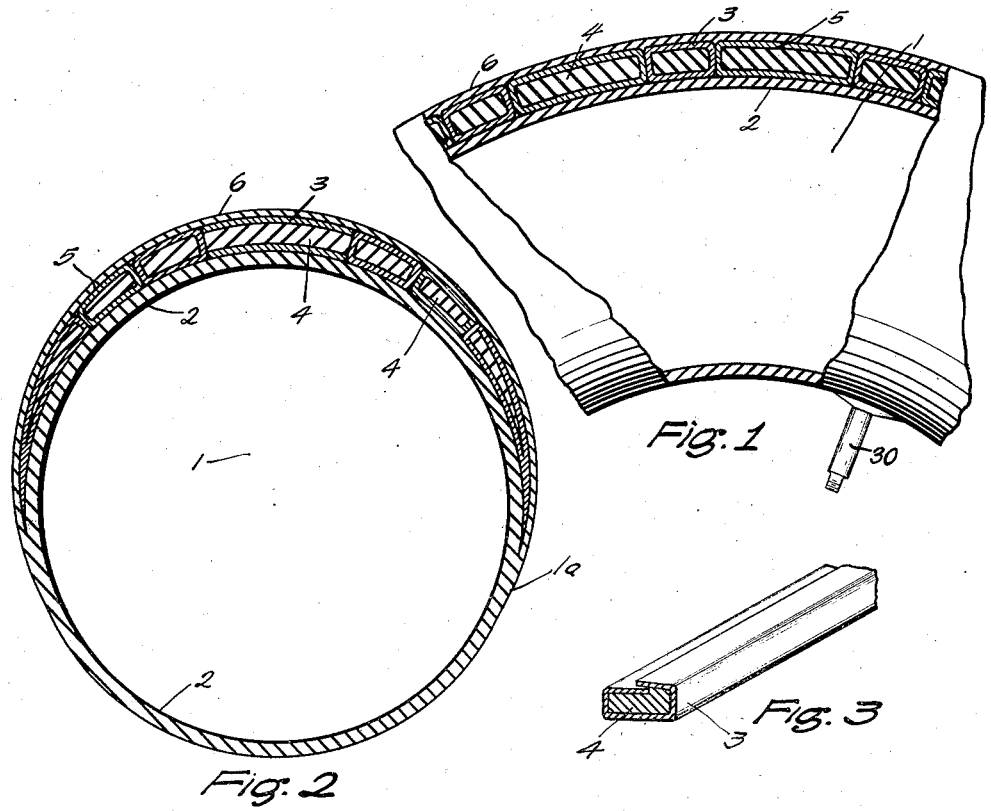
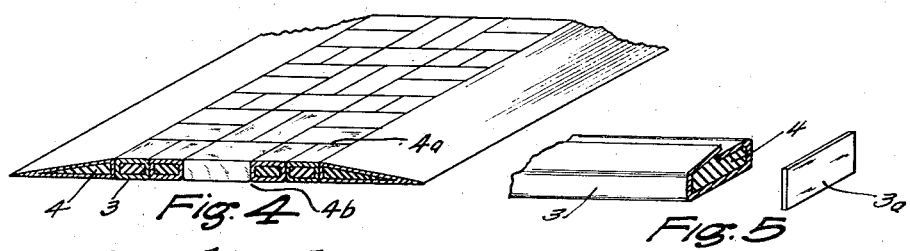
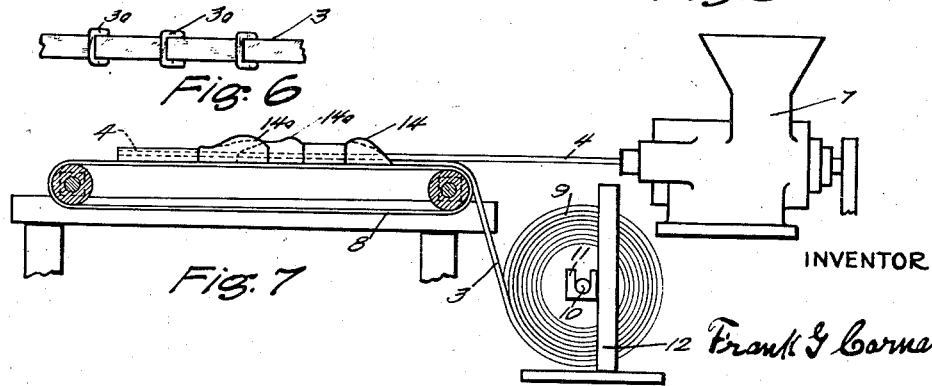
INVENTOR
Frank G Carnahan June 3, 1941.　　　　F. G. CARNAHAN　　　　2,244,648
METHOD OF PRODUCING SELF-SEALING TIRE INNER TUBES
Filed June 5, 1940　　　　2 Sheets-Sheet 2
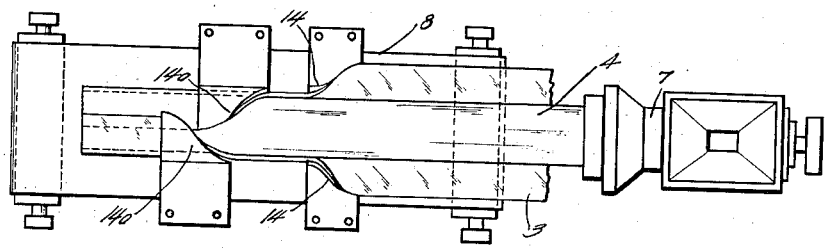
Fig. 8
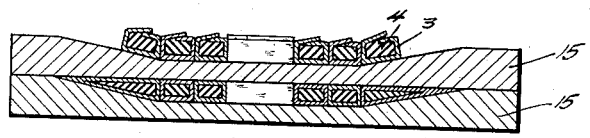
Fig. 9
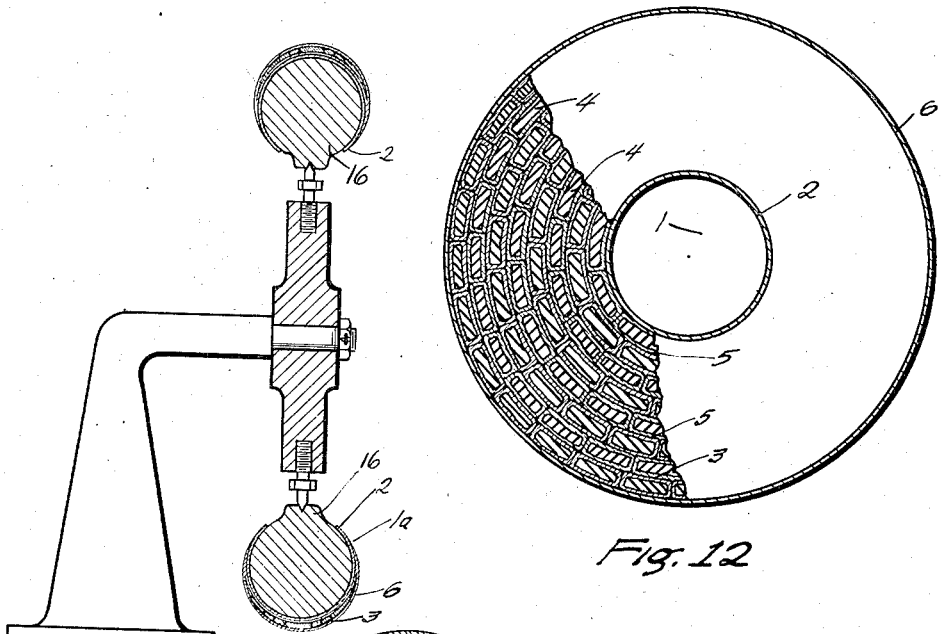
Fig. 10
Fig. 11
Fig. 12
INVENTOR
Frank G. Carnahan Patented June 3, 1941

2,244,648

UNITED STATES PATENT OFFICE 2,244,648

METHOD OF PRODUCING SELF-SEALING TIRE INNER TUBES

Frank G. Carnahan, Akron, Ohio

Application June 5, 1940, Serial No. 338,943

7 Claims. (Cl. 154—15)

My invention relates to certain new and useful improvements in inner tubes used in the inflation of tire casings. It particularly has for its object to provide a tube that when punctured will seal the injury thus caused and of such construction as to control the position of the sealing substance, especially when in service. There have been many efforts made to create an inner tube so constructed that when punctured the wound will be sealed. However the character of tire casings, the uses to which they are put and the manner in which they are used, have caused many new problems which must be considered in perfecting a tube that meets the requirements now demanded. Car weights per pound of tire, horsepower and top speed stress have all greatly increased during the last five years. Further it has been demonstrated that in order to furnish such desired tubes, the cost of production is an important factor to the end that the public in general may be able to secure same. Inner tubes of various constructions have been produced, many of such have merit to accomplish certain things, but none have answered the paramount questions fully, until my invention of a puncture self-sealing inner tube as below described.

My invention relates primarily to the construction of an inner tube, used in tire casings, having an air chamber with a sealing member on the outside of said air chamber, said sealing member having the sealing substance controlled in action, tubes for general use having the sealing member on the outer side of the tread sector of the air chamber and for special uses further around the air chamber; the sealing member containing a non vulcanizable plastic substance which seals punctures, and wounds, such as cuts and wounds that do not penetrate into the air chamber but which, if left unhealed, remain a weakness in the tube; the plastic substance being so located and of such design and dimensions as to effectively seal such injuries, and the manner of so doing.

Another object is to provide a puncture self-sealing tire tube in which the plastic sealing feature is maintained in a normal, unstretched condition when the tube is in service. It has been general practice in building puncture-seal inner tubes, to so construct them that the sealing feature is inside the air chamber walls. As for example, where a sheet of rubber is laid on and around a drum, the plastic feature added, and the edges of the sheet of rubber brought around and united to form a tube. The sealing feature is obviously within the walls of the air chamber. (See Letters Patent to Crossan, No. 1,959,460, issued May 22, 1934, for example.) This construction, when the tube is in use, causes strains to be placed at the junction of the sealing member with the walls of the tube, at the places where the greatest bending and flexing takes place, with a resulting weakness at such locality and tendency to misplacement of the plastic member.

Tubes have been made with the sealing member attached to the outside of the air chamber by placing the sealing feature on a completed tube and then curing the whole. (See Letters Patent, Waber, No. 1,808,091, issued June 2, 1931, for example.) This method fails to assure the mechanical effect desirable, as a firm base to work on in applying the members is lacking, due to the action of air within the tube, even when partially inflated. And in order to obtain a good union of parts free from trapped air, it is quite necessary to have a firm base on which to work. I have found that the best results are obtained when the tube is built so that the plastic is placed so as to be in a natural, unstretched and non-distorted position and condition when the inner tube is in the casing. And that to obtain such result, the plastic member should be placed on and attached to the outside wall of the air chamber. The dimensions of the whole being such that the outside diameter of the completed tube corresponds to the inside diameter of the tire casing in which same is used and the plastic is accordingly without distortion; thus avoiding the tendency of pockets or thin places in the plastic, which otherwise are prone to occur, and giving the maximum of plastic protection and permitting the plastic to function most advantageously. I have found that in order to prevent throwing or balling of the plastic due to action when the tube is in use in its tire casing, it is advisable to confine the plastic within a given area, which must be large enough to contain a predetermined quantity of plastic so that it may be able to properly operate when needed to fulfill its function of sealing. Obviously too large an area does not concentrate the plastic sufficiently to secure the best results and small areas require too many non-plastic walls which tend to create spots where the plastic is lacking (areas where the plastic is lacking) or is handicapped in or prevented from sealing by non-plastic material and by not having sufficient plastic available. (See Letters Patent to Gordon and Jacobs, No. 1,392,826, issued October 4, 1921, for example.) I have found that the best results are obtained where such tread areas contain not more than four and one-half cubic inches or less than one cubic inch of plastic in non-vulcanizable plastic surrounded by vulcanizable rubber walls and where the said walls do not form a continuous unbroken strip or rib around the tube longitudinally, and that the said areas should be so placed as to be staggered and have broken joints at points so as to provide flexiblity which serves to mitigate traction stress while the tube is in service and also provides the maximum sealing protection; and that a way to prepare the assembly of areas or cells is well shown in Fig. 9, in which 15 is a shaping form or mold.

The foregoing and other objects, features and advantages of the invention will be clear from the following description in connection with the accompanying drawings wherein several embodiments are shown by way of illustration and wherein Fig. 1 is a fragmentary side view, partly broken away and in section, of an inner tube embodying the invention;

Fig. 2 is a vertical transverse sectional view through the tube shown in Fig. 1 in which 1a indicates the point of union of the cover 6 to the outer side of the side walls of the air chamber 1;

Fig. 3 is a perspective view of a single block or cell of non-vulcanizable sealing composition covered with vulcanizable rubber;

Fig. 4 is a similar view of a plurality of such sealing blocks arranged together transversely;

Fig. 5 shows a single strip, 3a, of vulcanizable rubber used in forming the blocks or cells in closing the otherwise exposed ends and severed portion;

Fig. 6 is a sectional view through covered ends of blocks or cells containing a sealing substance;

Fig. 7 is a longitudinal sectional view showing diagrammatically how the blocks or cells of Fig. 3 and Fig. 4 are produced;

Fig. 8 is a top plan view thereof;

Fig. 9 is a transverse sectional view showing the way the blocks of Figs. 3 and 4 are prepared;

Fig. 10 shows a view of one form on which the tube parts are assembled;

Fig. 11 is a vertical transverse sectional view of an inner tube embodying the invention with a plurality of layers of cells or blocks containing a sealing substance superimposed one layer on the other;

Fig. 12 is a vertical transverse sectional view of an inner tube embodying the invention in which the blocks or cells containing a sealing substance completely surround the air chamber of the tube and are in staggered position.

Referring first to Figs. 1 and 2, it will be seen that the improved tube comprises an endless annular body of vulcanizable rubber having an air chamber 1 formed and constructed in the manner as hereinafter described as being one of the ways such can be practically done. This air chamber has united to the outer side of its tread wall 2 and an integral part thereof, a plurality of circumferentially extending cells 5 formed of vulcanizable rubber 3 and 3a and filled with a soft or plastic sealing composition 4. The sealing composition is also preferably composed of rubber but is compounded so as not to vulcanize and thus to remain in its plastic state after the body portion has been fully vulcanized as well as to retain its plasticity under all conditions of use. In this illustrated embodiment, the filled cells or blocks 5 are arranged in a single row or layer over the tread portion of the air chamber wall 2 but it is to be understood that if found desirable the filled cells 5 may be arranged in two or more rows or layers and that all of such rows or layers or any one or more of them may be extended or continued transversely of the air chamber wall any distance around the air chamber or until they entirely enclose the air chamber or any portion of it found necessary to function in service efficiently as for example if the tube is to be used as a military tube the layers of cells or blocks 5 will extend to completely cover and enclose the air chamber 1, being outside of its walls, 2, proper, illustrated in Fig. 12. The whole assembly of cells being enclosed with a vulcanizable rubber cover 6 which becomes the outer wall of the finished tube or part of same. Any puncturing object entering that part of the air chamber 1, protected by the cells 5, from the outside of the wall of the tube 6, will pass through the wall of the tube 6, the two walls of the cell 5, the wall 2 of the air chamber 1 and the sealing plastic 4 within the cells 5. As the puncturing object is withdrawn from the tube, a quantity of sealing composition from the punctured cell will flow or be drawn into the hole formed in the vulcanized rubber of the cell wall 3 and the outside wall 6 of the tube. After the puncturing object has drawn a quantity of the sealing composition into the hole or rupture made in the outside wall 6 of the tube, there will still remain an ample quantity to cover and seal the hole or rupture through the wall 2 of the air chamber. The same action of sealing takes place when only the outer wall 6 and the cell 5 of the tube is cut or punctured. Any air that may leak from the said air chamber as a result of said hole or rupture must pass through the two walls 3 of the cell 5, the plastic substance 4 and the outside wall 6 of the tube, to reach the atmosphere and it will be seen that by virtue of the plasticity of the sealing composition 4 the hole or rupture will be sealed and the escape of air from within the air chamber will be prevented.

One method of manufacturing the tube comprising this invention is as follows:

A common extruding machine (see Fig. 7) equipped with suitable dies to form the filler stock 4 to the desired predetermined dimensions is used having an ordinary conveyor belt 8 of adequate length and width as a take-off for the extruding machine. Arranged in roll 9 and supported by bar 10 which in turn is supported in bracket 11 of the stock rack 12 so as to feed or be drawn along the top of conveyor belt 8 in such manner that filler stock 4 will drop or be deposited on top of it, is the vulcanizable rubber cover 3 of suitable width to be formed about plastic stock 4 and to overlap itself as shown best in Fig. 3. Positioned along the conveyor belt 8 are folders 14 and 14a which may be of any common type used to fold tubes in the rubber industry and functions here to fold the cover 3 snugly around the plastic 4 and to splice the cover by overlapping its edges to any width desired down to a butt splice or a butt splice may be used if desired. In extruding, over the exposed end of the strip a sheet of vulcanizable rubber 3a, Fig. 5 is placed which becomes one of the walls of cell 5. The extruding is a continuous operation and the assembled strip Fig. 3 is manually or automatically cut to a predetermined length and over the ends of the severed parts a vulcanizable sheet of rubber is placed 3a, Fig. 5, which becomes one of the walls of the blocks or cells 5 containing the plastic 4; said sheet of rubber 3a, may be omitted where an end of the severed part lies against the wall, 3, of the adjoining cell 5, 4a and 4b, Fig. 4, as the side wall 3 of such adjoining cell 5 serves the purpose of said sheet of rubber 3a. It will be obvious to those familiar with the art of extruding rubber that the plastic 4 can be extruded with beveled, rounded or square edges, or other modifications and be satisfactorily covered as described above by modifying the stock folders 14 and 14a. Also that the width of the separate strips may be varied as shown in Fig. 4 where the center block or cell is wider than the adjacent cells. And also that the strips as they are extruded from the tube machine may be extruded with the plastic 4 covered with its coat 3 and ready to be cut into blocks or cells. In constructing the tube, the base tube or air chamber 1 is first formed. In so doing a sheet of vulcanizable rubber 2 of predetermined dimensions which has been prepared by calendering or by extruding from a tube machine is laid on and completely around a circular form 16 of predetermined dimensions. One of such forms is shown in Fig. 10, and the ends united, thus making a complete circle longitudinally; the sides of said rubber 2 fitted down and around the form so as to shape a circle, transversely, having the inner or rim side open, the outer side or periphery being the tread wall of the air chamber. The blocks or cells 5 of predetermined dimensions containing not more than four and one-half cubic inches nor less than one cubic inch of plastic 4 are then laid on and completely around, longitudinally, and to a predetermined distance, transversely, and attached to the said vulcanizable rubber sheet 2 and being attached together. This is preferably done by laying a cell 5 of predetermined dimensions on the center, transversely, of said air chamber wall 2, the centers of each being concentric, transversely; laying a predetermined number of cell blocks 5 of predetermined dimensions on each side of the center cell, applying additional cells 5 of predetermined dimensions, so as to completely surround, longitudinally, the tread sector of the air chamber 1 and also a predetermined number of cells 5 to a predetermined distance around the said air chamber 1, transversely. A sheet of vulcanizable rubber 6 of predetermined dimensions is laid over and around, longitudinally and transversely, the assembly and the ends united so as to make a complete circle, longitudinally; unite the edges of said sheet 6 to the outer side of the side walls, 1a, Fig. 2, of the air chamber 1. Thus making, without distortion and without thin spots from stretching complete, as to form, a puncture sealing inner tube of predetermined dimensions, having a circular form of proper dimensions both transversely and longitudinally, but not united on the rim side. The assembled tube is then removed from the work form 16; the walls on the rim side united by a butt or lapped splice; a tube valve 30, which may be of any suitable type, placed in position; and the completed tube vulcanized, the plastic or sealing composition remaining unvulcanized. In vulcanizing the tube, I prefer using a tube mold as now used in general practice in making rubber inner tubes for tire casings.

Where the cells or blocks of sealing composition 5 completely surround the air chamber 1, transversely, the cover 6 is not attached to the side walls 2 of the air chamber 1, but completely covers the entire assembly and its ends and edges are united by butt or lapped splice, Fig. 12.

In applying the plastic blocks or cells 5 to the outer side of the air chamber wall 2, I prefer that the first row of same be laid with the center cell having the longer side running transversely and the cells next adjoining same running longitudinally, and the cells be staggered. The cells 5 may be assembled to predetermined dimensions and the assembly then attached to the rubber sheet 2 on the work form 16. Where one layer of cells is used as in Fig. 2, a shaping form or mold, 15, Fig. 9, may be used in assembling the cells. A predetermined number of cells or blocks 5 is used according to the requirements of the tube under construction, Figs. 11 and 12.

For the vulcanizable rubber parts 6, 2, 3, and 3a, I have found that any good tire inner tube compound is satisfactory. The sealing composition 4 may be obtained in several ways which will be understood by those skilled in the art of compounding rubber. One such compound that I have found satisfactory for sealing may be compounded as follows:

| | Pounds |
|---|---|
| Smoked sheets | 75 |
| Rosin oil | 10 |
| Mineral oil | 7 |
| Pine tar oil | 7 |

A completed puncture self-sealing inner tube is produced, made to predetermined dimensions without distortion of the parts, having an air chamber 1; and having the sealing feature located on the outer surface of the air chamber wall 2; and having the sealing substance 4 confined in areas so predetermined as to dimensions as to properly perform its sealing functions.

The word rubber herein is understood to mean the product usable in the manufacture of pneumatic tires and inner tubes for same whether the composition contains natural or synthetic rubber or is made of compounds functioning with like attributes. And it is understood that the words cell and cells, and block and blocks, are used synonymously as designating relatively short lengths composed of a non-vulcanizable sealing substance and vulcanizable rubber.

Obviously the invention is susceptible of numerous modifications in detail of construction and in the steps of the method and the right is therefore reserved to make such changes as fall within scope of the appended claims without departing from the spirit of the invention.

Other advantages of my invention will be clear to those skilled in the art and it is thought that from the foregoing description, taken in connection with the accompanying drawings, the construction, operation and advantages of the invention will be clear to those skilled in the art to which it appertains.

What I claim is:

1. The method of producing inner tubes, which consists of extruding plastic sealing composition in elongated sections, feeding a strip of vulcanizable rubber composition into contact with the sealing composition, and folding the vulcanizable strip about the sealing composition to form a cover for the sealing composition and to retain it in strip form, cutting said assembled strip into relatively short predetermined lengths, covering the plastic sealing composition that becomes exposed by cutting with a strip of vulcanizable rubber whereby the plastic sealing composition in the said relatively short lengths is entirely enclosed by a cover of vulcanizable rubber, forming a tube blank of vulcanizable rubber about a tube shaping form of substantially the same shape and dimensions of the inside of the finished tube being fabricated but open at its base portion to facilitate removal from said shaping form, attaching the lengths of sealed plastic to the outer surface of said tube blank of vulcanizable rubber in a predetermined arrangement wherein the joints between the various sections are broken, attaching a cover of vulcanizable rubber of predetermined dimensions over the assembly, removing the assembled blank and lengths of plastic sealing composition and cover, from said form, closing the open base portion of the said assembly to form a composite tube of substantially the same size, shape and proportions as the finished tube being fabricated, attaching a conventional inner tube valve to the assembly and vulcanizing the composite assembly to form a self-sealing tire inner tube.

2. Steps in the method of producing puncture self-sealing inner tubes for tires which consist of forming the air chamber of the tube by placing a rubber tube blank of vulcanizable rubber of predetermined dimensions about a tube shaping form of predetermined dimensions; attaching to the outer surface of the wall of the air chamber, blocks of vulcanizable rubber containing a non-vulcanizable sealing substance, said blocks being so arranged that predetermined points make broken joints which prevent a continuous partition, longitudinally, around the air chamber; covering the assembly with a sheet of vulcanizable rubber; vulcanizing the parts, the sealing composition remaining unvulcanized.

3. Steps in the method of producing puncture self-sealing inner tubes for tire casings which consist of providing a vulcanizable rubber tube blank, shaping same on a shaping form; which rubber tube blank forms the wall of an air chamber and attaching blocks of vulcanizable rubber containing a sealing substance, which is non-vulcanizable, to the outer surface of the walls of said air chamber; said blocks completely surrounding the said air chamber, longitudinally, and to predetermined points, transversely; the said blocks of sealing substance being of varied predetermined dimensions and shapes, and being placed in rows, transversely, with broken joints at predetermined points; the vulcanizable parts being vulcanized into a homogeneous whole, and the sealing substance remaining unvulcanized.

4. Steps in the method of producing inner tubes for tire casings which consist of extruding a non-vulcanizable sealing composition in elongated sections of predetermined dimensions; covering such sections with vulcanizable rubber; forming said elongated sections into cells by cutting same into relatively short lengths of predetermined dimensions; forming the air chamber of the tube under construction by putting a rubber tube blank of vulcanizable rubber about a tube form of predetermined dimensions and shape, leaving the base on the rim side of said rubber blank open; attaching to the outside surface of the tread wall of said tube blank a predetermined number of said cells of predetermined dimensions, in a predetermined relation one with the other; attaching a vulcanizable rubber cover over and around the assembly; uniting the ends of said cover; uniting the edges of said cover to the outer surface of the side walls of the air chamber at predetermined points; removing the assembly from the shaping form and complete the forming of the air chamber by closing the opening of the said tube blank; attaching a conventional inner tube valve; and vulcanizing the assembly, the sealing composition remaining unvulcanized.

5. Steps in the method of producing puncture self-sealing inner tubes for tires which consists of forming the air chamber of the tube by forming a tube blank of vulcanizable rubber, of predetermined dimensions, about a tube shaping form of predetermined dimensions, said tube blank being open at its base portion to facilitate removal from said shaping form; attaching, to the outer surface of said tube blank, cells of predetermined dimensions and shapes of vulcanizable rubber containing a non-vulcanizable sealing composition; said cells being laid in staggered position and completely around the said air chamber, longitudinally, and to a predetermined distance and thickness, transversely; attaching a cover of vulcanizable rubber of predetermined dimensions completely over the said cells; removing the assembly from the shaping form; closing the open base portion of the said assembly to form a composite tube of predetermined dimensions; attaching a conventional inner tube valve to the assembly and vulcanizing the assembly to form a self-sealing tire inner tube in which the sealing composition remains unvulcanized.

6. Steps in the method of producing inner tubes, which consist of extruding plastic sealing composition in elongated sections, feeding a strip of vulcanizable rubber composition into contact with the sealing composition, and folding the vulcanizable strip about the sealing composition to form a cover for the sealing composition and to retain it in strip form, cutting said assembled strip into relatively short predetermined lengths, covering the plastic sealing composition that becomes exposed by cutting with a strip of vulcanizable rubber whereby the plastic sealing composition in the said relatively short lengths is entirely enclosed by a cover of vulcanizable rubber, forming a tube blank of vulcanizable rubber about a tube shaping form of substantially the same shape and dimensions of the inside of the finished tube being fabricated but open at its base portion to facilitate removal from said shaping form, attaching the lengths of sealed plastic to the outer surface of said tube blank of vulcanizable rubber in a predetermined arrangement wherein the joints between the various sections are broken, removing the assembled blank and lengths of plastic sealing composition from said form, closing the open base portion of the said assembly to form a composite tube of substantially the same size, shape and proportions as the finished tube being fabricated, attaching a conventional inner tube valve to the assembly and vulcanizing the composite assembly to form a self-sealing inner tube.

7. Steps in the method of producing inner tubes for tires, which consist of forming the air chamber of the tube being fabricated by forming a tube blank of vulcanizable rubber about a tube shaping form of substantially the same shape and dimensions of the inside of the finished tube being fabricated, said blank being open at its base on the rim side to facilitate removal from said shaping form; extruding a non-vulcanizable sealing composition in elongated sections of predetermined shapes, in strip form, said sections being covered with vulcanizable rubber of suitable gauge; cutting said elongated sections into relatively short lengths; forming a composite puncture-sealing unit by assembling the relatively short lengths, arranged in predetermined positions wherein the joints between the various said short lengths are broken, the composite sealing unit being formed to predetermined dimensions; attaching the said assembled sealing unit to the outer surface of the wall of the said tube blank in predetermined position; attaching a cover of vulcanizable rubber of predetermined dimensions over the assembly; removing the composite assembly from the said shaping form; closing the open base portion of the assembly to form a composite tube of the size, shape, and proportions as predetermined; attaching a conventional inner tube valve to the assembly and vulcanizing the composite assembly into a homogeneous whole, the sealing composition remaining unvulcanized.

FRANK G. CARNAHAN.